United States Patent [19]
Herlin et al.

[11] Patent Number: 6,023,689
[45] Date of Patent: Feb. 8, 2000

[54] METHOD FOR SECURE COMMUNICATION IN A TELECOMMUNICATIONS SYSTEM

[75] Inventors: Harry Herlin, Grapevine; Tie Luo, Arlington, both of Tex.

[73] Assignee: Nokia Mobile Phones Limited, Espoo, Finland

[21] Appl. No.: 09/250,638

[22] Filed: Feb. 16, 1999

Related U.S. Application Data

[63] Continuation of application No. 08/796,613, Feb. 7, 1997, Pat. No. 5,915,021.

[51] Int. Cl.[7] ............................... H04L 9/08; H04L 9/00; H04L 9/30
[52] U.S. Cl. .............................. 705/67; 380/247; 380/30; 380/277; 380/278; 705/71; 713/171
[58] Field of Search ......................... 380/255, 259, 380/260, 270, 277, 278, 283, 284, 285, 28, 30, 347–250; 705/50, 64, 65, 67, 71; 713/150, 168, 171

[56] References Cited

U.S. PATENT DOCUMENTS

| | | | |
|---|---|---|---|
| 4,956,863 | 9/1990 | Goss | 380/30 |
| 5,222,140 | 6/1993 | Beller et al. | 380/30 |
| 5,299,263 | 3/1994 | Beller et al. | 380/30 |
| 5,406,628 | 4/1995 | Beller et al. | 380/30 |
| 5,557,346 | 9/1996 | Lipner et al. | 380/21 |
| 5,557,678 | 9/1996 | Ganesan | 380/21 |
| 5,588,061 | 12/1996 | Ganesan et al. | 380/30 |
| 5,761,305 | 6/1998 | Vanstone et al. | 380/21 |
| 5,784,463 | 7/1998 | Chen et al. | 380/21 |
| 5,915,021 | 6/1999 | Herlin et al. | 380/21 |

*Primary Examiner*—Bernarr E. Gregory
*Attorney, Agent, or Firm*—Brian T. Rivers

[57] ABSTRACT

A method for sending a secure message in a telecommunications system utilizing public encryption keys. All authentication parameters of each of the users, including each user's decryption key that is known only to the user, are used to verify, by public key methods, the identity of a user sending a communication to another user of the system. During the authentication process, an encryption key for use in communications between the two users may also be generated. The generated encryption key may be a private session key. Once the initial authentication is completed, the private session key can be used to perform encryption that is less computationally demanding than public key methods. In an embodiment of the invention, two communicating users may use the method to authenticate each other and generate an encryption key that is used to encrypt subsequent communications between the users. During the process of this embodiment, two encryption keys are generated. A first encryption key is used only in the authentication process, and a second encryption key is used in both the authentication process and as the key for encrypting subsequent communications. Use of two encryption keys requires that each of the two users apply its decryption key to complete the authentication and encryption key agreement process successfully.

4 Claims, 4 Drawing Sheets

METHOD FOR SECURE COMMUNICATION IN A TELECOMMUNICATIONS SYSTEM

This application is a continuation of U.S. application Ser. No. 08/796,613, filed Feb. 7, 1997, now U.S. Pat. No. 5,915,021.

FIELD OF THE INVENTION

This invention relates to secure communications in telecommunications systems and, more particularly, to a method for secure communications between users operating in a telecommunications system utilizing public key algorithms.

BACKGROUND OF THE INVENTION

Advances in telecommunications systems technology have resulted in a variety of telecommunications systems and services being available for use. These systems include cellular telephone networks, personal communications systems, various paging systems, and various wireline and wireless data networks. Cellular telephone networks currently in use in the United States include the AMPS analog system, the digital IS-136 time division multiplexed (TDMA) system, and the digital IS-95 digital code division multiplexed (CDMA) system. In Europe the Global Services for Mobile (GSM) digital system is most widely used. These cellular systems operate in the 800–900 MHz range. Personal communications systems (PCS) are also currently being deployed in the United States. Many PCS systems are being developed for the 1800–900 MHz range, with each based on one of the major cellular standards.

In each of the above-mentioned telecommunications systems, it may often be desirable for the operators of the system to provide secure communications to users of the system. The provision of secure communications may include authentication and encryption key agreements between two mobile stations or between a base station and a mobile station operating in the system, or between any other two units within the network.

In analog systems, such as AMPS, it is very difficult to provide secure communications. The analog nature of the signals carrying the communication between two users does not permit easy or efficient encryption. In fact in standard AMPS, no encryption is used and communications sent between a mobile station and base station may be monitored and intercepted. Anyone having a receiver capable of tuning to the frequencies used for the communication channels may intercept a message at any time, without being detected. The possibility of interception has been one negative factor connected with analog systems such as AMPS. Because of this potential for interception, AMPS-type systems have not been favored for certain business or governmental uses, where sending a secure message is a requirement.

The newer digital systems such as GSM, IS-136, and IS-95 have been developed so as to include encryption services for communications privacy. The digital nature of the speech or data signals carrying the communications between two users in these digital systems allows the signals to be processed through an encryption device to produce a communications signal that appears to be random or pseudorandom in nature, until it is decrypted at an authorized receiver. When it is desired to send a secure message in such a system, the encryption feature of the system can be used to encrypt the message. As an example, the short message service (SMS) feature specified in these standards could be used to send a text message that is encrypted according to the system encryption algorithm. Voice communications could also be encrypted using the system encryption algorithm.

In the GSM, IS-136, and IS-95 systems, the encryption is performed on message transmissions between each user and the system by using a secret key value, "session key," where the key is known only to the system and the user communicating with the system. The system standards under consideration for PCS networks may also include encryption services that are based on the encryption techniques specified in the digital standard from which a particular PCS standard is derived, i.e., GSM, IS-136, or IS-95.

In GSM the system operator controls the security process by issuing a subscriber identity module (SIM) to each system user. The SIM is a plug-in chip or card that must be inserted into a mobile station that a user intends to make or receive calls through. The SIM contains a 128-bit number called the Ki that is unique for each user. The Ki is used for both authentication and deriving an encryption key. In GSM a challenge and response procedure is used to authenticate each user and generate encryption bits from Ki for the user. The challenge and response procedure may be executed at the discretion of the home system.

When a GSM mobile is operating in its home system, and after the user has identified himself by sending in his international mobile system identity/temporary mobile system identities (IMSI/TMSI), a 128-bit random number (RAND) is generated in the system and combined with the mobile user's Ki to generate a 32-bit response (SRES). The system then transmits RAND to the mobile which, in turn, computes its own SRES value from the mobile user's Ki, and transmits this SRES back to the system. If the two SRES values match, the mobile is determined to be authentic. Encryption bits for communications between the mobile and systems are generated in both the mobile and network by algorithms using RAND and Ki to produce an encryption key "Kc." Kc is then used at both ends to encrypt and decrypt communications and provide secure communications. When a GSM mobile is roaming, the RAND, SRES and Kc values are transferred to a visited system upon registration of the user in the visited system, or upon a special request from a visited system. The Ki value is never available other than in the home system and the user's SIM.

The IS-136 and IS-95 authentication and encryption procedures are identical to each other and are similar to the GSM authentication and encryption procedures. In IS-136 and IS-95 systems a challenge response method is also utilized. The IS-136 and IS-95 method utilizes a security key called the "A-key." The 64-bit A-key for each mobile is determined by the system operators. The A-key for each mobile is stored in the home system of the mobile's owner and in the mobile itself. The A-key may be initially communicated to the mobile owner in a secure manner, such as the United States mail. The owner can then enter the A-key into the mobile via the keypad. Alternatively, the A-key may be programmed into the mobile station at the factory or place of service. The A-key is used to generate shared secret data (SSD) in both of the mobile and the home system from a predetermined algorithm. SSD for each mobile may be periodically derived and updated from the A-key of that particular mobile by use of an over-the-air protocol that can only be initiated by the home system operator.

In IS-136 and IS-95 authentication and encryption, a 32-bit global challenge is generated and broadcast at predetermined intervals within systems in the service area of the mobile. When a mobile attempts system registration/call setup access in the home system, the current global challenge response is used to compute, in the mobile, an 18-bit authentication response from the mobile's SSD. An access request message, including the authentication response and a call count value for the mobile, is then sent to the home system from the mobile. Upon receiving the access request the home system will compute its own response value using the global challenge and the mobile's SSD. If the mobile is verified as authentic, by comparison of the authentication responses, the mobile's SSD and other relevant data, including the call count value, the mobile is registered.

When a mobile attempts system registration/call setup access in a visited system, the current global challenge response is used to compute, in the mobile, the 18-bit authentication response from the mobile's SSD. An access request message is then sent to the visited system from the mobile. For initial registration accesses in a visited system, the access request message includes the authentication response computed in the mobile. The authentication response and global challenge are then sent to the home system of the mobile, where the home system will compute its own response value using the global challenge and the mobile's SSD. If the mobile is verified as authentic, by comparing the authentication responses, the mobile's SSD and other relevant data, including the call count value, is then sent to the visited system and the mobile is registered. When a call involving the mobile is set up, a current authentication response value and call count are sent to the system from the mobile along with the call setup information. Upon receiving the call setup information, the visited system retrieves the stored SSD and call count values for the requesting mobile. The visited system then computes an authentication response value to verify that the received SSD value and the current global challenge produce the same response as that produced in the mobile. If the authentication responses and call counts match, the mobile is allowed call access. If communications security is desired, an encryption key is produced in both the mobile and system by using the global challenge and the mobile's SSD as input to generate encryption key bits.

Further background for such techniques as those used in GSM and the IS-136 and IS-95 systems may be found in the article, "Techniques for Privacy and Authentication in Personal Communications Systems," by Dan Brown in IEEE Personal Communications dated August 1995, at pages 6–10.

While the above-described private key procedures used in the GSM and the IS-136 and IS-95 systems provide communications security, none of these procedures is entirely immune to interception and eavesdropping. All of the procedures require that a user's A-key or Ki value be known both in the mobile station and home system. They also require that the user's SSD or Kc value be known at both ends of the communications link, i.e., in the system and in the mobile. Each of these values could potentially be corrupted and become known to a potential interceptor. An individual knowing the Ki or A-key of a user, or an individual who intercepts the Kc or SSD of the user in intersystem communications, could also intercept and eavesdrop on communications that were intended to be secure and private. Additionally, since each user's keys are available at a base station with which they are communicating, encrypted communications involving two mobile stations connected through a base station of a system could be breached at the base station.

Public key encryption methods are methods in which a user is assigned an encryption key that is public, i.e., may be known and revealed publicly, but is also assigned a private decryption key that is known only to the user. Only an intended receiving user's decryption key can decrypt an encrypted message meant for the intended receiving user, i.e., decrypt a message encrypted using the intended receiving user's encryption key. In order to send a secure message to an intended receiver a user would encrypt the message using the intended receiver's encryption key before sending the message. When the intended receiver received the encrypted message, the intended receiver would decrypt the message using the intended receiver's decryption key. In a public key encryption telecommunication system, the user would be allowed to keep the decryption key to himself, away from base stations or the system. Since the key necessary for decrypting a message is known only to the receiving user, public key encryption methods could provide more secure communications than are obtainable with the current encryption techniques being used in, for example, GSM, IS-136, or IS-95.

Public key encryption methods provide the added advantage that a message can be encoded and subsequently decoded by first applying the encryption key of a receiving user to a message to encode before transmission, and then applying the decryption keys of the receiving user after reception to decode, or, by first applying the decryption key of a sending user to a message to encode before transmission, and then applying the encryption key of the sending user in the receiver after reception to decode. A first user can sign a message by applying the first user's decryption key to a message and send both the signed message and a copy of the message. Upon receiving the message, a second user can verify that the message came from the first user by applying the first user's encryption key to the received signed message, and then checking to see if the result is the same as the received copy of the message. Since only the first user knows the first user's decryption key, the copy of the message and the signed message (after application of the encryption key) received by the second user will be identical only if sent by the first user.

Since the decryption key of each user may be kept totally private, secure methods of communication between users in a telecommunications system that require each user to use and apply his/her decryption key, so that his/her identity can be verified to the other users, would provide good security. However, the use of public key encryption may require intensive use of computational resources in a communicating device such as a mobile phone. The use of public key algorithms to encrypt and decrypt every message or voice communication could be very computationally expensive as compared to private key algorithms.

It would, therefore, be advantageous to provide a method for secure communications between users operating in a telecommunications system, in which public key methods were used to verify the identities of communicating parties, and in which less computationally expensive encryption methods were used once identities are verified.

SUMMARY OF THE INVENTION

The present invention provides a method for secure communications between users in a telecommunications system. The method provides a highly secure process by requiring that all authentication parameters of each of the users, including each user's decryption key that is known only to the user, are used to verify the identity of a user sending a communication to another user of the system by public key methods. During the authentication process, an encryption key for use in communications between the two users may also be generated. The generated encryption key may be a private session key. Once the initial authentication is completed, the private session key can be used to perform encryption that is less computationally demanding than public key methods.

In an embodiment of the invention, two communicating users may use the method to authenticate each other and generate an encryption key that is used to encrypt subsequent communications between the users. During the process of this embodiment, two session keys are generated. A first session key is used only in the authentication process, and a second session key is used in both the authentication process and as the key for encrypting subsequent communications. The use of two session keys requires that each of the two users apply its decryption key in order to complete the authentication and encryption key agreement process successfully.

The system is assigned a public key algorithm A0 having a public key E0 and a private key D0. A function f(t,p) is also defined so that it is computationally impossible to find any two different pairs of values for the variables t and p giving the same result for f(t,p), i.e., if different pairs of values for t and p are randomly chosen the chances of f(t,p) generating the same result is near zero. E0, f(t,p) and A0 are known at all mobiles stations and base stations in the system that operate according to the invention. Upon initiation of service of a mobile station Mx operating according to the invention, a public key algorithm Amx having keys Emx and Dmx is assigned to mobile station Mx. Mx is also assigned an identity mx. The identity mx is used to compute a certificate Cmx for Mx where Cmx=D0(f(mx,Emx)). Similarly, each base station Bx operating according to the invention is assigned a public key algorithm Abx, having keys Ebx and Dbx, and is also assigned an identity bx used to compute a certificate Cbx for Bx where Cbx=D0(f(bx,Ebx)). The authentication triplet for Mx is (mx,Emx,Cmx) and the authentication triplet for Bx is (bx,Ebx,Cbx). The identities mx and bx may be distinguished as mobile station and base station identities, respectively, to prevent a mobile user's identities being used to impersonate a base station.

At the start of the key agreement and authentication procedure, base station Bx sends the triplet of Bx to mobile station Mx. Mx then uses the bx and Ebx values of the triplet in f(bx,Ebx) to verify the certificate Cbx of Bx. Mx then selects an encryption key k1 and sends Ebx(k1) to Bx. Bx next decrypts Ebx(k1) using Dbx. Mx next sends its triplet that has been encrypted using k1 to Bx. Bx decrypts Mx's triplet using k1 and uses the mx and Emx values of the triplet in f(mx,Emx) to verify the certificate Cmx of Mx. Bx then selects a new encryption key k2 and sends Emx(k2) to Mx. Mx next decrypts Emx(k2) using Dmx. Both Mx and Bx are now authenticated and in subsequent communications may communicate securely using the key k2.

In another embodiment of the invention, the method may be used for electronic cash transfer or the transfer of other confidential data. The process may be used to transfer electronic cash between users of a telecommunications system. In this embodiment, each user that communicates directly with another user authenticates the other user by verifying all authentication parameters of the other user. Each pair of communicating users also agrees on a key for communications between the two users. Also, each time a communication originating at a particular user is passed from one user to another, all authentication parameters of the user originating the communication are verified by the receiving user.

For the transfer of electronic cash, the system is assigned a public key algorithm A0 having a public key E0 and a private key D0. A function f(t,p) is also defined so that it is computationally impossible to find any two different pairs of values for the variables t and p giving the same result for f(t,p), i.e., if different pairs of values for t and p are randomly chosen the chances of f(t,p) generating the same result is near zero. E0, f(t,p) and A0 are known by all users utilizing the method, including mobile stations and banks in the system that operate according to the invention. Upon initiation of service of a mobile station Mx operating according to the invention, a public key algorithm Amx having keys Emx and Dmx is assigned to mobile station Mx. Mx is also assigned an identity mx. The identity mx is used to compute a certificate Cmx for Mx where Cmx=D0(f(mx,Emx)). Similarly, each bank Bax operating according to the invention is assigned a public key algorithm Abax, having keys Ebax and Dbax, and is also assigned an identity bax used to compute a certificate Cbax for Bax where Cbax=D0(f(bax,Ebax)). The authentication triplet for Mx is (mx,Emx,Cmx) and the authentication triplet for Bax is (bax,Ebax,Cbax). The identities mx and bax may be distinguished as mobile station and bank identities, respectively, to prevent a mobile user's identities being used to impersonate a bank.

Users may deposit or withdraw electronic cash in or from a bank and transfer the cash to other users. The electronic cash includes a statement of the amount and the authentication parameters, including a bank certificate, of the bank in which the electronic cash originated. Each time two users directly communicate, they authenticate each other and generate a session key using the authentication and key agreement method described above for the first embodiment of the invention, with the users as the communicating parties in place of the mobile Mx and base station Bx. Each user may be a mobile station or a bank. When electronic cash is transferred between two users, after authentication and key agreement between the two directly communicating users, all authentication parameters of the bank in which the electronic cash originated are verified by the receiving user.

BRIEF DESCRIPTION OF THE DRAWINGS

A more complete understanding of the method of the present invention may be had by reference to the following detailed description when read in conjunction with the accompanying drawings wherein.

DETAILED DESCRIPTION OF THE INVENTION

Figure 1:
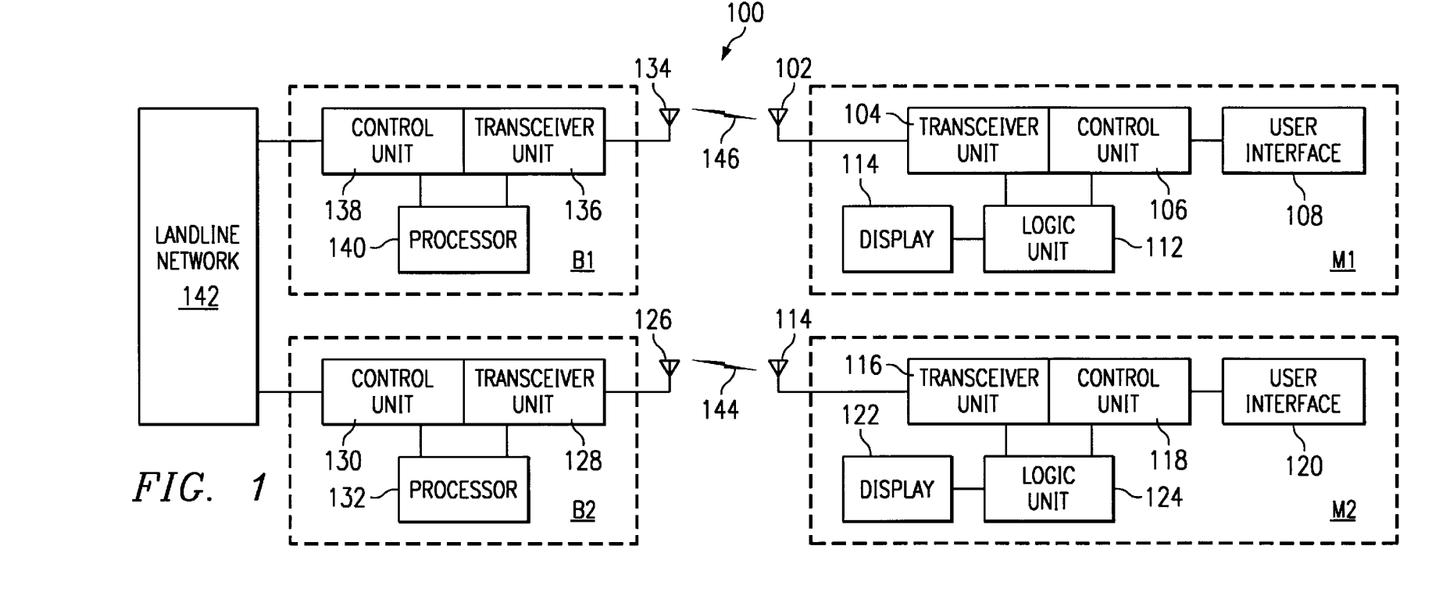
FIG. 1 illustrates a block diagram of a telecommunications system that provides authentication and key agreement according to an embodiment of the invention.

FIG. 1 illustrates a block diagram of a telecommunications system 100 constructed according to an embodiment of the invention. System 100 comprises base stations B1 and B2, land line network 142, and mobile stations M1 and M2. Although shown to include two base stations and two mobile stations, system 100 may comprise more or fewer base stations or mobile stations than are shown in FIG. 1. The mobile stations M1 and M2 may be mobile telephones that provide speech communications between a user of M1 or M2 and another mobile telephone, or between the user and a land line telephone connected to landline network 142. Mobile stations M1 and M2 may also be any other type of mobile communications device capable of operating according to the system standard for system 100, such as a personal communications device or a laptop computer operating through a wireless modem. Landline network 142 may be a public switched telephone network (PSTN) or a private landline network for system 100 that includes mobile switching centers for controlling call routing, registration and hand-off of a mobile from one base station to another in system 100. In system 100, mobile stations M1 and M2 may move about the coverage area of system 100 while communicating with the base stations of system 100 through RF links. In FIG. 1, mobile stations M1 and M2 are shown to be communicating with base stations B1 and B2, respectively, over RF links 144 and 146, respectively. System 100 may operate according to any telecommunications system standard that provides a digital interface over the RF links between mobile stations M1 and M2, and base stations B1 and B2. The design and operation of digital telecommunications systems is known and will not be described in detail here. System 100 may be implemented in any number of ways. For example, the digital RF interface in system 100 may operate according to a standard similar to the Telecommunications Industry Association/Electronic Industry Association (TIA/EIA) IS-136, IS-95, and PCS 1900 standards or the European GSM standard.

Mobile station M1 includes a transceiver unit 104 coupled to an antenna 102 for receiving radio signals from and transmitting radio signals to base stations of system 100. Mobile station M1 includes a user interface 108, which could be a computer keyboard or a mobile telephone handset with a keypad, microphone and earpiece. Control unit 106 in mobile station M1 controls RF channel selection and other system functions in the conventional manner, and a logic unit 112 controls the general operation of the mobile station. Logic unit 112 may also be utilized to implement and perform encryption and decryption functions on transmitted and received messages according to the embodiment of the invention. Display 110 provides a general visual interface to the user of mobile station M1 and is under control of logic unit 112. Mobile station M2 includes transceiver unit 116, user interface 120, control unit 118, logic unit 124, and display 122, each having the function as described for the corresponding section of mobile station M1.

Base station B1 includes a transceiver unit 136 coupled to antenna 134 for receiving radio signals from and transmitting radio signals to mobile stations. B1 also includes control unit 138 and processor 140. Control unit 138 controls RF channel selection and assignment by generating the appropriate control messages to mobile stations, and also controls other necessary system functions such as interfacing with landline network 142. Processor 140 may be utilized to implement and perform encryption and decryption functions used for communications security. Base station B2 includes transceiver unit 128, antenna 126, control unit 130 and processor 132, each having the function as described for the corresponding section of base station B1.

Figure 2:
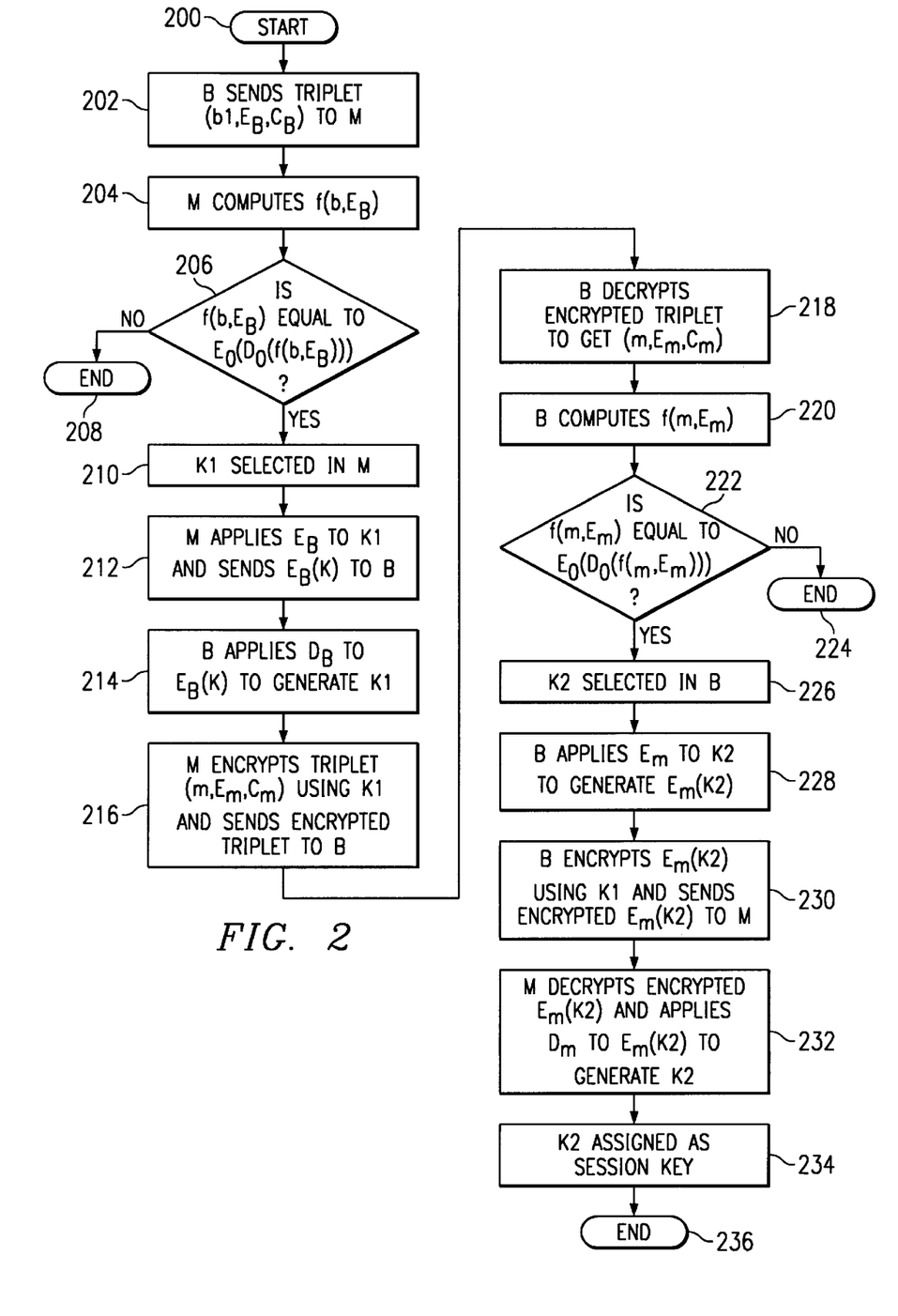
FIG. 2 is a flow diagram showing process steps performed to provide authentication and key agreement between a mobile station and base station operating within the telecommunications system of FIG. 1.

Referring now to FIG. 2, therein is illustrated a flow diagram showing process steps performed to provide key agreement and authentication within a telecommunications system operating according to an embodiment of the invention. In this embodiment, the system is assigned a public key algorithm A0 having a public key E0 and a private key D0.

A function f(t,p) is also defined so that it is computationally impossible to find any two different pairs of values for the variables t and p giving the same result for f(t,p), i.e., if different pairs of values for t and p are randomly chosen the chances of f(t,p) generating the same result is near zero. For example, the function f(t,p) may be a hushing function H(t,p), commonly used to shorten transmitted messages, where the value H(t,p) is the exclusive-or operation done between t and p. E0, f(t,p) and A0 are known at all mobile stations and base stations in system 100 that operate according to the invention. Upon initiation of service of a mobile station Mx, where x equals an integer, operating according to the invention in system 100, a public key algorithm Amx having keys Emx and Dmx is assigned to mobile station Mx. Mx is also assigned an identity mx. The identity mx is used to compute a certificate Cmx for Mx where Cmx=D0(f(mx, Emx)). Similarly, each base station Bx, where x equals an integer, operating according to the invention is assigned a public key algorithm Abx, having keys Ebx and Dbx, and is also assigned an identity bx used to compute a certificate Cbx for Bx where Cbx=D0(f(bx,Ebx)). The authentication triplet for Mx is (mx,Emx,Cmx) and the authentication triplet for Bx is (bx,Ebx,Cbx). The identities mx and bx may be distinguishable within the system as mobile station and base station identities, respectively, to prevent a mobile user's identities being used to impersonate a base station.

The key functions Emx, Dmx, Ebx and Dbx may be chosen according to the Rabin criteria. In the Rabin algorithm for this example, two prime numbers p and q are chosen using a selected predefined number N, where p×q=N, and p=$4k_1$+3, and, q=4 $k_2$+3, and where $k_1$ and $k_2$ are constants. N may be publicly known, while p and q must be kept private. Emx is defined as Emx(c)=$(c)^2$ mod Nmx, and Dmx is defined as Dmx(c)=$c^{1/2}$ mod Nmx, where c is the encrypted value. To solve Dmx(c) for $c^{1/2}$, the equations $x^2$=c mod p, and $x^2$=c mod q, are solved using the solutions, $x_1$=±$c^{(p+1)/4}$, and $x_2$=±$c^{(q+1)/4}$. If two values a and b are found such that ap+bq=1, then $c^{1/2}$ can be found by the equation $c^{1/2}$=bq $x_1$+apx$_2$ mod Nmx. The process for using Dbx and Ebx, and the process for using E0 and D0 is identical to the process for using Emx and Dmx. The certificate Cmx=D0(f(mx,Emx))=$(f(mx,Emx))^{1/2}$ mod N0 and the certificate Cbx=D0(f(bc,Ebx))=$(f(bx,Ebx))^{1/2}$ mod N0. A general description of the Rabin algorithm is given in the book, "Cryptography, Theory and Practice," by Stinson, published by CRC, 1995, at pages 143–148.

As an alternative, the key functions Emx, Dmx, Ebx and Dbx may be chosen according to the Rivest, Shamir and Adleman (RSA) criteria. In RSA two (large) prime numbers p and q are first selected, where p×q=N. Two other values, a2 and b2, are then chosen, where (a2)(b2)=1 mod (p-1)(q-1). N and a2 may be public, and b2 must be kept private. Em2 and Dm2 are then defined as Em2(c)=$(c)^{a2}$ mod N, and Dm2=$(c)^{b2}$ mod N. A detailed description of the RSA algorithm is given in the book, "Digital Money," by Lynch et al., published by John Wiley and Sons, 1996, at pages 76–86.

The flow diagram of FIG. 2 illustrates an example in which the key agreement and authentication procedure is used for communications between mobile station M1 and base station B1. In the example shown, the process begins at base station B1, although the process may begin at either M1 or B1. The process starts at step 200 where the key agreement and authentication procedure is initiated in B1. At step 202 B1 sends the triplet (b1,Eb1, Cb) to M1. Next, at step 204, M1 computes f(b1,Eb1) from the received values b1 and Eb1. The process then moves to step 206 where M1 authenticates Cb by making a determination as to whether or not the computed f(b1,Eb1) is equal to E0(Cb), where Cb is the value Cb received from B1 in the triplet (b1,Eb1, Cb). If f(b1,Eb1) does not equal E0(Cb), Cb is not authenticated and the triplet received in step 202 may have been sent by an impersonator of B1. In this case the process moves to step 208 and ends. If, however, f(b1,Eb1) equals E0(Cb), Cb is authenticated, and the process moves to step 210.

At step 210 M1 selects an encryption key (k1). Next, at step 212, M1 applies Eb1 to k1 to generate Eb1(k1) and sends Eb(k1) to B1. After receiving Eb1(k1) from M1, B1 then, at step 214, applies Db1 to Eb1(k1) to generate Db1(Eb1(k))=k1. Next, at step 216, M1 encrypts M1's triplet (m1,Em1,Cm1) using k1 and sends the encrypted triplet to B1. After receiving the encrypted triplet, B1 then decrypts the encrypted triplet at step 218 using k1 to regenerate the triplet (m1,Em1, Cm1). Next, at step 220, B1 computes f(m1.Em1) using the values m1 and Em1 received in the triplet from M1. The process then moves to step 222 where B1 authenticates Cm by making a determination as to whether or not the computed f(m1,Em1) is equal to E0(Cm), where Cm is the Cm received from M1 in the triplet. If f(m1,Em1) does not equal E0(Cm), Cm is not authenticated and the triplet may have been sent by an impersonator of M1. In this case, the process moves to step 224 and ends. If, however, f(m1,Em1) equals E0(cm), Cm is authenticated and the process moves to step 226.

At step 226 B1 selects a new encryption key (k2). B1 will use k2 for subsequent encryption. Next, at step 228, B1 applies Em1 to k2 to generate Em1(k2). Then, at step 230, B1 encrypts Em1(k2) using k1 and sends the encrypted Em1(k2) to M1. After receiving the encrypted Em1(k2) M1 decrypts the encrypted Em1(k2) at step 232, and applies Dm1 to Em1(k2) to generate Dm1(Em1(k2))=k2. Next, at step 234, M1 assigns k2 as its session encryption key. M1 and B1 can now engage in encrypted communications using the session key k2. The key authentication and assignment process then moves to step 236 and ends.

In the process of FIG. 2, steps 200–214 authenticate B1 to M1. In order to impersonate B1, an imposter X has to send the identical triplet (b1,Eb1, Cb1) to M1 because of the property of the function f(b1,Eb1). Even if X succeeds in obtaining the triplet (b1,Eb1,Cb1), step 214 prevents X from getting the key k1 and continuing in the communications. Steps 216–232 authenticate M1 to B1. If an imposter X succeeds in obtaining M1's triplet (m1,Em1, Cm1), step 232 will prevent X from getting the key k2 and continuing in the communications. The encryption using k1 also prevents an imposter from intervening in at step 218 and impersonating the base station.

Figure 3:
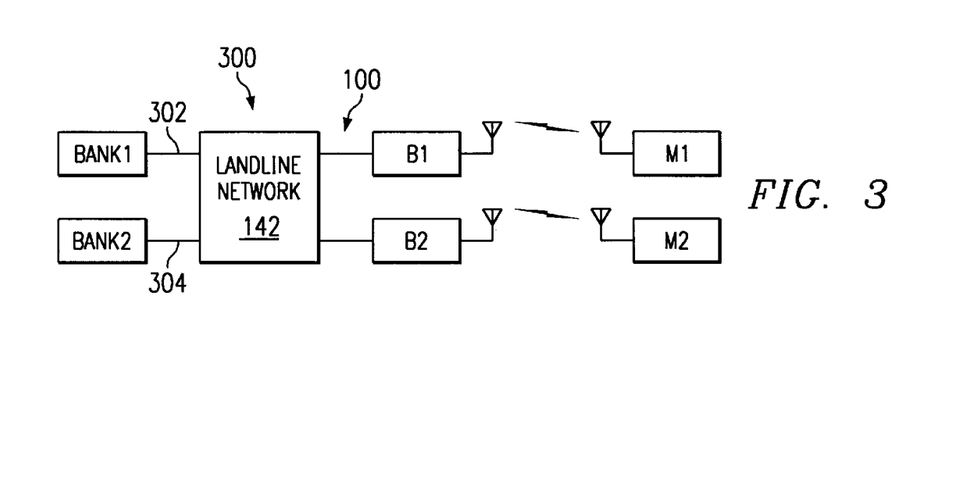
FIG. 3 illustrates a block diagram of a telecommunications system that provides secure electronic cash transfer according to an embodiment of the invention.

In another embodiment of the invention, the method of authentication and key agreement may be utilized to provide the secure flow of electronic cash. Referring now to FIG. 3, therein is illustrated a telecommunications system for the transfer of electronic cash. The system 300 comprises system 100 of FIG. 1, Bank1 and Bank2. Bank1 and Bank2 are connected to the landline network 142 through conventional phone lines 302 and 304, respectively. System 100 is as described for FIG. 1. Bank1 and Bank2 each include telecommunications equipment capable of encrypting and decrypting messages received over phone lines 302 and 304, similarly to control unit 106 and logic unit 112 of mobile station M1. The electronic cash transfer takes place with the mobile stations M1 and M2 and the banks Bank1 and Bank2 as the endpoints of the electronic cash flow. Authentication and key agreement is done between the endpoints of the electronic cash flow. Authentication and key agreement between any of the mobiles, M1 and M2, and the banks Bank1 and Bank2 may be done by the process of FIG. 2 with the two communicating parties in place of M1 and B1 in the process. While the communications between the mobiles, M1 and M2, and base stations, B1 and B2, may be encrypted as described for FIG. 2, this is optional. Any authentication and key agreement between the mobile stations and base stations will be transparent and at a different level than the authentication and key agreement for the electronic cash transfer.

In this embodiment of the invention a user of M1 is able, for example, to transfer cash electronically to a user of M2. As is done for the embodiment of FIG. 1, the system 300 is assigned a public key algorithm A0 having a public key E0 and a private key D0. A function f(t,p) is also defined so that it is computationally impossible to have any two different pairs of the variables t and p giving the same result for f(t,p), i.e., if different pairs of values for t and p are randomly chosen the chances of f(t,p) generating the same result is near zero. E0 and A0 are known at all mobile stations and Banks in system 300 that operate according to the invention. Upon initiation of service of a mobile station Mx operating according to the invention in system 300, a public key algorithm Amx having keys Emx and Dmx is assigned to mobile station Mx. Mx is also assigned an identity mx. The identity mx is used to compute a certificate Cmx for Mx where Cmx=D0(f(mx,Emx)). Similarly, each bank Bankx operating according to the invention is assigned a public key algorithm Abax, having keys Ebax and Dbax, and is also assigned an identity bax used to compute a certificate Cbax for Bankx where Cbax=D0(f(bax,Ebax)). The authentication triplet for Mx is (mx,Emx,Cmx) and the authentication triplet for Bankx is (bax,Ebax,Cbax). The key functions for the embodiment of FIG. 3 may be similar to those described for the embodiment of FIG. 2. For example, the RSA or Rabin algorithms maybe used. The identities mx and bax may be distinguished as mobile station and bank identities, respectively, to prevent a mobile user's identities being used to impersonate a bank.

Figure 4A:
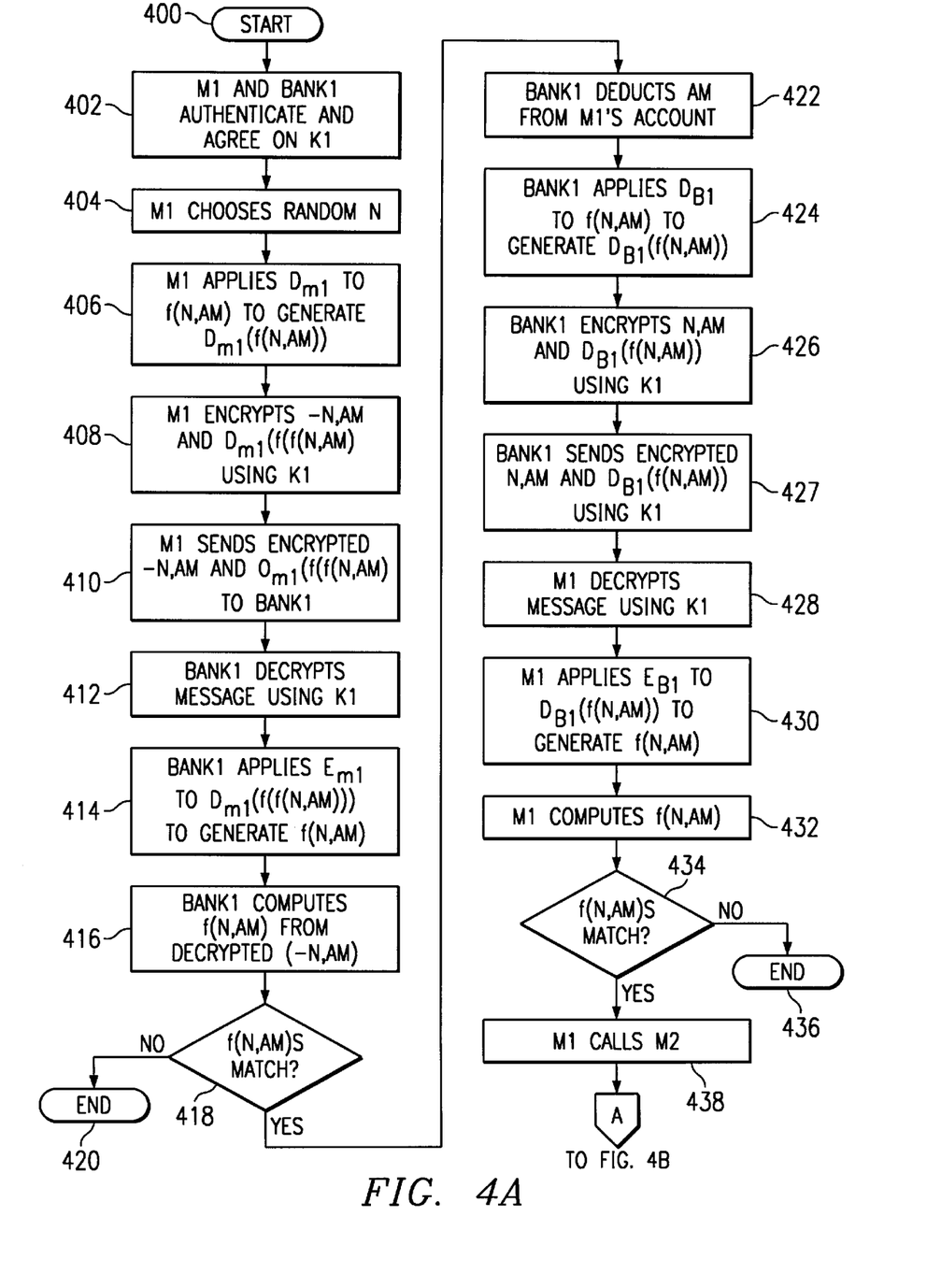
FIGS. 4A and 4B are flow diagrams showing process steps performed to provide secure electronic cash transfer within the telecommunications system of FIG. 3.
Figure 4B:
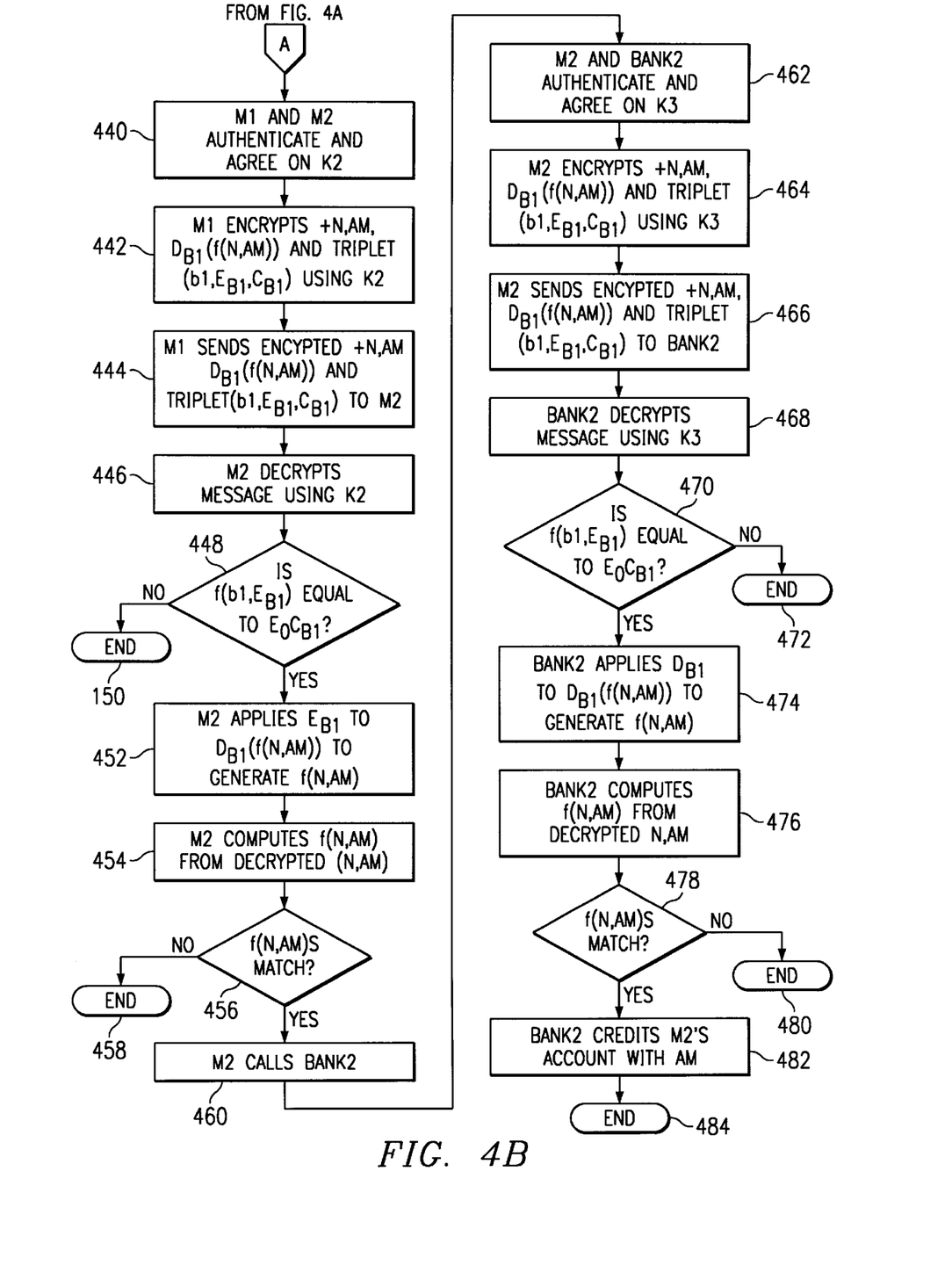

Referring now to FIGS. 4A and 4B, therein are flow diagrams illustrating process steps performed during the transfer of electronic cash according to an embodiment of the invention. FIGS. 4A and 4B illustrate an example in which a user of mobile station M1 wishes to perform an electronic cash transfer to the user of M2. The process starts at step 400 when M1 initiates a call to Bank1. Next, at step 402, M1 and Bank1 authenticate each other and agree on a key k1. The authentication and key agreement of Step 402 may be performed using the process described in FIG. 1, with Bank1 in place of base station B1. Next, at step 404, a random number N is selected at M1, and M1 is also given an amount (AM) that the user of M1 desires to transfer to M2. At step 406 M1 computes f(N,AM), where AM is the amount to be transferred, and applies Dm1 to f(N,AM) to generate the f(N,AM) signed by M1 or Dm1(f(N,AM)). Then, at step 408, M1 encrypts −N, AM and Dm1(f(N,AM)) using k1, and at step 410, an encrypted statement including −N, AM and Dm1(f(N,AM)) is sent by M1 to Bank1. The sign of N may be set negative to indicate that M1 is debiting the account belonging to the user of M1 by the amount AM. The sign is set only to indicate a debit is being made, and in all calculations N is assumed positive. After receiving the encrypted −N, AM and Dm1(f(N,AM)) Bank1 decrypts the statement at step 412 using k1 to generate −N, AM and Dm1(f(N,AM)). Next, at steps 414, 416 and 418, Bank1 checks the integrity of the statement to ensure that it was sent from M1. This check serves as a double check on the security of the process. At step 414, Bank1 applies Em1 to Dm1(f(N,AM)) to generate Em1(Dm1(f(N,AM))=f(N,AM). At step 416, Bank1 computes f(N,AM) from the decrypted –N,AM. A determination is then made at step 418 as to whether or not the f(N,AM) computed in step 416 is equal to the f(N,AM) received from M1. If the two f(N,AM) values do not match, the integrity of the statement has been compromised, and the process moves to step 420 and ends. If, however, the two f(N,AM) values match, the statement is verified and the process move to step 422.

At step 422 Bank1 deducts the amount AM from the account of the user of M1. Next, at step 424, Bank1 applies Dba1 to f(N,AM) to generate Dba1(f(N,AM)). At step 426 Bank1 encrypts N,AM and Dba1(f(N,AM)) using k1. Bank1 then, at step 427, sends the encrypted statement including N,AM and Dba1(f(N,AM)) to M1. The sign of N in the statement may be set positive to indicate that Bank1 is sending a crediting statement, i.e., a statement that will credit the receiving party. At step 428 M1 then decrypts the encrypted N,AM and Dba1(f(N,AM)) received from Bank1. Next, at steps 430, 432 and 434, M1 checks the integrity of the statement to ensure that it was sent from Bank1. At step 430 M1 applies Eb1 to Dba1(f(N,AM)) to generate f(N, AM). At step 432 M1 computes f(N,AM) from the decrypted N,AM. A determination is then made at step 434 as to whether or not the f(N,AM) computed in step 432 is equal to the f(N,AM) received from Bank1. If the two f(N,AM) values do not match, the integrity of the statement has been compromised and the process moves to step 436 and ends. If, however, the two f(N,AM) values match, the statement is verified and the process moves to step 438.

At step 438 M1 initiates a call to M2. Next, at step 440, M1 and M2 authenticate and agree on a session key k2. The authentication and key agreement of step 440 may be performed using the process described in FIG. 2, with M1 in place of base station B1. Next, at step 442, M1 encrypts +N, AM, Dba1(f(N,AM)) and the triplet (ba1,Eba1,Cba1) using k2, and then sends the encrypted statement +N, AM, and Dba1(f(N,AM)) and the triplet (ba1,Eba1,Cba1) to M2 at step 444. The value N is assigned a positive sign here to indicate that M1 is sending electronic cash that is credited to another's account. At step 446 M2 decrypts the message received from M1 using k2. A determination is then made at step 448 as to whether or not the certificate Cba1 received from M1 is authentic. At step 448, M2 computes f(ba1,Eba1) from the ba1 and Eba1 received from M1 and compares the computed f(ba1,Eba1) with E0(Cba1)=E0(Dba1(f(ba1, Eba1))). If the two f(ba1,Eba1) values do not match, the certificate Cba1 is not valid and the process moves to step 450 and ends. If, however, the two f(ba1,Eba1) values match, the certificate Cba1 is verified and the process moves to step 452.

Next M2 checks the integrity of the statement to ensure that it was originally sent from Bank1. At step 452 M2 applies Eba1 to Dba1(f(N,AM)) to generate f(N,AM). At step 454 M2 computes f(N,AM) from the decrypted N,AM. A determination is then made at step 456 as to whether or not the f(N,AM) computed in step 452 is equal to the f(N,AM) received from M1. If the two f(N,AM) values do not match, the integrity of the statement has been compromised and the process moves to step 458 and ends. If, however, the two f(N,AM) values are equal, this verifies that the statement was originally signed by Bank1, and the process moves to step 460.

At step 460 M2 initiates a call to Bank2. Next, at step 462, M2 and Bank2 authenticate and agree on a session key k3. The authentication and key agreement of step 440 may be performed using the process described in FIG. 2, with, for example, M2 in place of M1 and Bank2 in place of base station B1. Next, at step 464, M2 encrypts +N,AM, Dba1 (f(N,AM)) and the triplet (ba1,Eba1,Cba1) using k3. At step 466 M2 sends the encrypted +N,AM, Dba1(f(N,AM)) and the triplet (ba1,Eba1,Cba1) to Bank2. After receiving the message from M2 Bank2 then decrypts the encrypted +N,AM, Dba1(f(N,AM)) and the triplet (ba1,Eba1,Cba1) at step 468. A determination is then made at step 470 as to whether or not the certificate Cba1 received from M2 is authentic. At step 470, Bank2 computes f(ba1,Eba1) from the ba1 and Eba1 received from M2 and compares the computed f(ba1,Eba1) with E0(Cba1)=E0(Dba1(f(ba1, Eba1))). If the two f(ba1,Eba1) values do not match, the certificate Cba1 is not valid and the process moves to step 472 and ends. If, however, the two f(ba1,Eba1) values match, the certificate Cba1 is verified and the process moves to step 474.

Next Bank2 checks the integrity of the statement to ensure that it was originally sent from Bank1. At step 474 Bank2 applies Eba1 to Dba1(f(N,AM)) to generate f(N,AM). At step 476 Bank2 computes f(N,AM) from the decrypted N,AM. A determination is then made at step 478 as to whether or not the f(N,AM) computed in step 476 is equal to the f(N,AM) received from M2. If the two f(N,AM) values do not match, the integrity of the statement has been compromised and the process moves to step 480 and ends. If, however, the two f(N,AM) values are equal, this verifies that the statement was originally signed by Bank1, and the process moves to step 482. At step 482 Bank2 credits the account of the user of M2 with the amount AM.

The teachings of this invention should not be construed to be limited for use only with the telecommunications standards described and should be construed to include any similar systems. Furthermore other encryption algorithms than those expressly disclosed above may be employed to practice this invention.

Thus the invention has been particularly shown and described with respect to preferred embodiments thereof, and it will be understood by those skilled in the art that changes in form and details may be made without departing from the spirit and scope of the invention.

What is claimed is:

1. In a telecommunications system having a first and second transceiving device, wherein each of the first and second transceiving devices is assigned a decryption key and a public encryption key, and said second transceiving device is assigned identifying information, a method for providing secure communications, said method comprising the steps of:

selecting a first session key at the second transceiving device;

encrypting the first session key using the public encryption key of said first transceiving device to generate a first message in the second transceiving device;

transmitting the first message to the first transceiving device;

decrypting the first message, at the first transceiving device using the decryption key of the first transceiving device to generate said first session key;

encrypting the identifying information in said second transceiving device using said first session key to generate a second message;

transmitting said second message from the second transceiving device to the first transceiving device;

decrypting the second message at the first transceiving device using said first session key to generate the identifying information;

verifying the identity of the second transceiving device using the identifying information; and in response to a positive verification in said step of verifying the identity of the second transceiving device:

selecting a second session key at said first transceiving device;

encrypting said second session key using the public encryption key of the second transceiving device to generate a third message in the first transceiving device;

transmitting said third message to the second transceiving device;

decrypting said third message, at the second transceiving device using the decryption key of the second transceiving device to generate said second session key; and using said second session key to encrypt subsequent communications between the first and second transceiving devices.

2. The method of claim 1, wherein said system is assigned a decryption key and a public encryption key, and wherein said method further comprises the steps of:

calculating and assigning a certificate for the second transceiving device by applying the decryption key of the system to a resultant value of a selected function, wherein the selected function has as inputs the public encryption key of the second transceiving device and the identifying information.

3. The method of claim 2, wherein the identifying information comprises an identity field and said step of encrypting the identifying information comprises encrypting said identity field, the public encryption key of the second transceiving device, and said certificate assigned to the second transceiving device using said first session key to generate a second message.

4. The method of claim 3, wherein said step of verifying comprises:

using said identity field and said public encryption key of the second transceiving device received in the second message as inputs to said selected function to generate a first result;

applying the public encryption key assigned to the system to said certificate assigned to the second transceiving device to generate a second result; and determining whether said first and second results are equal.

\* \* \* \* \*